(12) United States Patent
Maindron

(10) Patent No.: US 8,079,527 B2  
(45) Date of Patent: Dec. 20, 2011

(54) METHOD FOR FABRICATING AN ORGANIC DIODE-BASED IDENTIFICATION AND AUTHENTICATION DEVICE, DEVICE AND METHOD FOR USE

(75) Inventor: Tony Maindron, Grenoble (FR)

(73) Assignee: Commissariat A l'Energie Atomique et Aux Energies Alternatives, Paris (FR)

( * ) Notice: Subject to any disclaimer, the term of this patent is extended or adjusted under 35 U.S.C. 154(b) by 63 days.

(21) Appl. No.: 12/747,014

(22) PCT Filed: Dec. 5, 2008

(86) PCT No.: PCT/FR2008/001698  
§ 371 (c)(1),  
(2), (4) Date: Jun. 9, 2010

(87) PCT Pub. No.: WO2009/101295  
PCT Pub. Date: Aug. 20, 2009

(65) Prior Publication Data  
US 2010/0264223 A1 Oct. 21, 2010

(30) Foreign Application Priority Data  
Dec. 20, 2007 (FR) .................................. 07 08953

(51) Int. Cl.  
*G06K 19/00* (2006.01)

(52) U.S. Cl. ............. 235/487; 257/23; 257/40; 257/86; 204/547; 204/643

(58) Field of Classification Search .................. 235/487; 257/23, 40, 86; 204/547, 643  
See application file for complete search history.

(56) References Cited

U.S. PATENT DOCUMENTS

| | | |
|---|---|---|
| 6,635,988 B1 | 10/2003 | Izumizawa et al. |
| 2005/0003574 A1* | 1/2005 | Yang et al. ...................... 438/99 |
| 2006/0094340 A1* | 5/2006 | Ouderkirk et al. .............. 451/41 |
| 2006/0242698 A1* | 10/2006 | Inskeep et al. .................. 726/20 |
| 2007/0095669 A1* | 5/2007 | Lau et al. ........................ 204/547 |
| 2008/0197362 A1* | 8/2008 | Hisamoto et al. ............... 257/86 |
| 2010/0206731 A1* | 8/2010 | Lau et al. ........................ 204/547 |
| 2011/0180787 A1* | 7/2011 | Cho et al. ........................ 257/40 |

FOREIGN PATENT DOCUMENTS
WO  WO 01/57831 A1  8/2001

OTHER PUBLICATIONS
International Search Report mailed on Sep. 2, 2009 in corresponding International Application No. PCT/FR2008/001698 (with translation).

* cited by examiner

*Primary Examiner* — Allyson Trail  
(74) *Attorney, Agent, or Firm* — Oliff & Berridge, PLC

(57) ABSTRACT

The fabrication method comprises a step of exposing at least one organic diode to a gas, before packaging of the device, to form a plurality of randomly distributed black spots by impairment. Increasing the exposure time enables the size of the black spots to be increased, also randomly. The surface distribution of the black spots, visible by electroluminescence, enables an object associated with this distribution to be identified in reliable manner.

8 Claims, 2 Drawing Sheets

METHOD FOR FABRICATING AN ORGANIC DIODE-BASED IDENTIFICATION AND AUTHENTICATION DEVICE, DEVICE AND METHOD FOR USE

BACKGROUND OF THE INVENTION

The invention relates to a method for fabricating a device for identification and authentication of an object comprising formation of a plurality of randomly distributed identification elements in the device.

STATE OF THE ART

The document WO-A-01/57831 describes a method and device for identification and authentication of objects, plants or living beings. This method implements production of a volume identifier from a heterogeneous and hardening mixture of at least two non-miscible bodies. The volume identifier comprises random and statistically non-reproducible heterogeneities as regards shape and position guaranteeing the uniqueness of the identifier. In the case of a gaseous mixture with a liquid or pasty product, illustrated in FIG. 1, heterogeneities are obtained in the form of bubbles 1 of this same gas. Bubbles of random diameter are thus formed in the mixture at random locations and can act as identification elements 1. Identification elements 1 are sunk in the volume and are thereby not accessible by direct contact. They can therefore not be subjected to wear or damage like a barcode may be on a paper support medium. This method can also be implemented by mixing solid particles with a hardening product, the distribution of these particles being fixed randomly once the product has been frozen, then forming identification elements.

After the identifier has been fabricated, the latter is digitized by several series of images enabling a faithful reconstruction of the identifier to be made in three dimensions. This three-dimensional image is stored in a database. The identifier is then attributed to an object. An identifier can subsequently be used to authenticate an object. It is then digitized according to a plurality of angles enabling reconstruction thereof in three dimensions. Then the database is interrogated to instantaneously verify the authenticity of the identifier by comparing it to the data in the database. Such a three-dimensional identifier is unable to be falsified. However, use of this identifier is relatively complex on account of the reconstruction in three dimensions after acquisition of a series of images from different viewing angles.

OBJECT OF THE INVENTION

The object of the invention is to provide a device for identification and authentication of objects, plants, persons, animals or services that is simple and unable to be falsified.

According to the invention, this object is achieved by the fact that, the device comprising at least one organic light-emitting diode, the method comprises an exposure stage of the diode to at least one gas, before packaging of the device, to form said identification elements by impairment in the form of randomly distributed black spots visible by electroluminescence.

The invention also relates to a device obtained by this method and comprising an organic diode with identification elements in the form of black spots distributed randomly on a surface of the diode and visible by electroluminescence.

The invention further relates to a method for use of this device comprising powering-on of the diode, determination of the surface distribution of the black spots and comparison of this distribution with pre-recorded images associated with the objects to be identified.

BRIEF DESCRIPTION OF THE DRAWINGS

Other advantages and features will become more clearly apparent from the following description of particular embodiments of the invention given for non-restrictive example purposes only and represented in the accompanying drawings, in which.

DESCRIPTION OF PARTICULAR EMBODIMENTS

Figure 1:
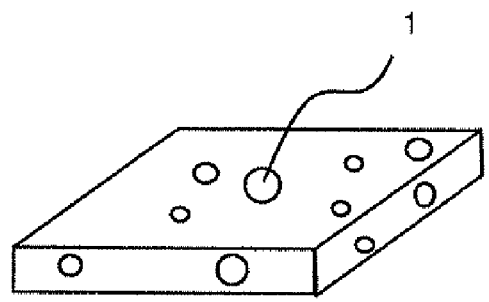
FIG. 1 illustrates an identifier according to the prior art.
Figure 2:
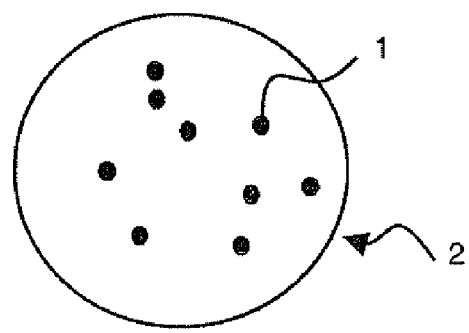
FIGS. 2 to 4 illustrate top views of three alternative embodiments of the invention.

According to an embodiment illustrated in FIG. 2, a device for identification and authentication of an object comprises a plurality of randomly distributed identification elements 1. Such a device comprises at least one organic light-emitting diode 2 and is achieved by:
  exposing the organic diode to at least one gas to form, by impairment of the diode, identification elements in the form of randomly distributed black spots visible by electroluminescence,
  packaging of the diode to stop impairment thereof.

An identifier based on organic diodes can thus be obtained that conventionally comprises an anode covered by at least one organic layer that is emissive by electroluminescence, and then a cathode. One of the major drawbacks of organic diodes, i.e. their sensitivity to moisture, is in fact made use of. When an organic diode is exposed to the atmosphere, it is in fact impaired at certain points, forming black spots. This impairment, due to structural defects, does not occur under normal circumstances if the method for producing organic diodes is well mastered, i.e. when the organic diodes are made in a glove-box in an inert atmosphere (gas or argon), preventing any penetration of water in the form of vapor. The invention uses these structural defects which present a random and therefore non-reproducible distribution to form the identifier.

The black spots correspond to areas in the form of pinholes that become incapable of emitting light. Thus, when the diode is powered-on, normally invisible black spots appear by electroluminescence. The invention consists in deliberately making black spots appear by exposing the organic light-emitting diode to the atmosphere or to a controlled atmosphere in an environmental chamber for a few minutes before packaging it.

The diode is preferably exposed to water vapor in an environmental chamber. The impairment corresponds to penetration of the water vapor into the organic diode.

The diode is then encapsulated, preferably in a package containing an inert gas, for example dinitrogen ($N_2$) or argon (Ar). This packaging enables the surface distribution of the black spots to be frozen preventing water molecules from subsequently penetrating into the diode. As the black spots no longer undergo any modification, they create a random pattern that is non-reproducible and cannot be falsified. Each spot thereby constitutes an identification element 1 to achieve an organic diode-based identifier 2.

Packaging can be performed in conventional manner using a glued glass cover or in monolithic manner by performing packaging in thin layers with oxide and/or nitride and/or polymer materials. A getter is preferably placed under the glass cover to absorb the residual moisture.

Figure 3:
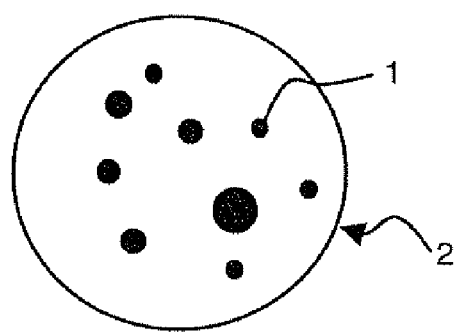

When the diode is fabricated, the diameter of the black spots can be increased by increasing the exposure time of the organic diode to the atmosphere or to the gas. Depending on the size of structural defects of the diode, infiltration of the gas is in fact more or less great and impairment of the diode more or less fast. As illustrated in FIG. 3, the black spots can thus have a distribution and a size that are both random. This additional random size enables security of identification to be very considerably increased.

Figure 4:
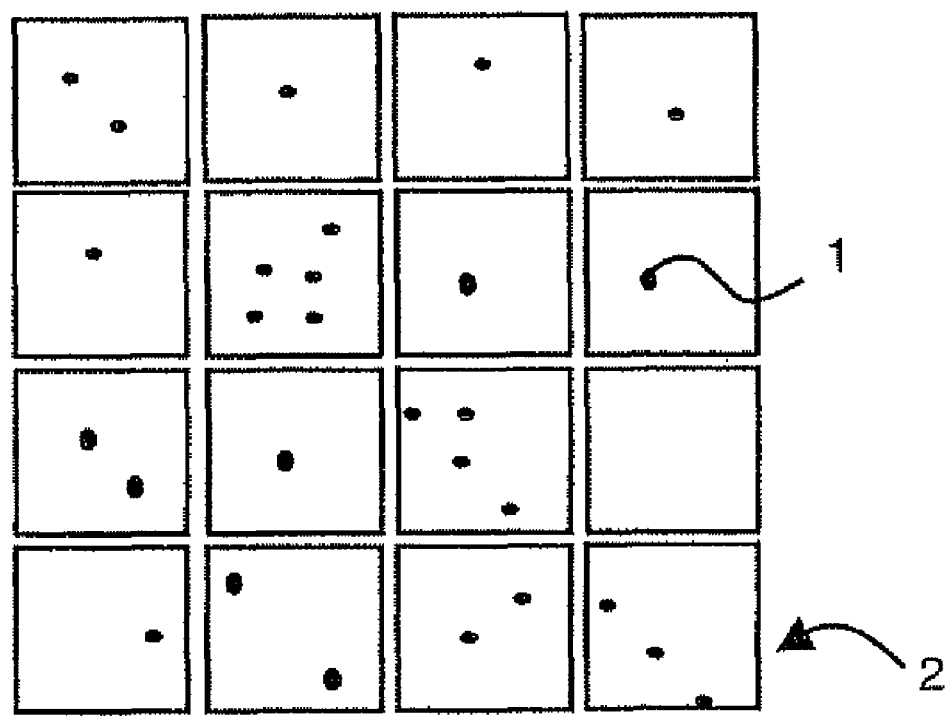

According to another embodiment illustrated in FIG. 4, an identifier 2 can be composed of a plurality of elemental diodes arranged in the form of a bar or a matrix forming a screen. This enables the surface distribution of the black spots to be made even more complex enhancing security even more. The number of elemental diodes can for example be a few hundred or so, each elemental diode constituting a screen pixel.

Such an identifier is designed to enable objects to be authenticated. What is meant by object is any type of plant, living being, material goods, or services. Once fabricated, the identifier is powered-on and an image of the surface distribution of the black spots is then captured and preferably digitized. This image can be pre-recorded in a database and associated with an object. When the object has to be authenticated, the identifier is powered-on and the surface distribution of the black spots is determined, for example by a camera, and then compared with the pre-recorded images in the database to verify the authenticity of the object.

Such identifiers are unable to be falsified due to the random distribution of the black spots. Recognition being performed on a surface distribution, it is much simpler to implement than in a three-dimensional identifier.

The invention claimed is:

1. Method for fabricating a device for identification and authentication of an object comprising formation of a plurality of randomly distributed identification elements in the device, method wherein the device comprising at least one organic light-emitting diode, the method comprises an exposure stage of the diode to at least one gas, before packaging of the device, to form said identification elements by impairment in the form of randomly distributed black spots visible by electroluminescence.

2. The method according to claim 1, wherein the gas is water vapor.

3. The method according to claim 1, wherein the device is packaged in a sealed casing in an inert atmosphere after formation of the identification elements.

4. The method according to claim 3, wherein a getter is placed in the packaging casing.

5. Identification device obtained by the method according to claim 1, comprising at least one organic diode and a plurality of identification elements in the form of randomly distributed black spots visible in electroluminescence.

6. The device according to claim 5, wherein the black spots are of random size.

7. Device according to claim 5, comprising a plurality of organic diodes forming a screen.

8. Method for using the device according to claim 5, comprising powering-on of the diode, determination of the surface distribution of the black spots and comparison of this distribution with pre-recorded images associated with the objects to be identified.

* * * * *